United States Patent

Grant et al.

[15] 3,641,365

[45] Feb. 8, 1972

[54] PRECISION FAST ANALOG SWITCH

[72] Inventors: Jon H. Grant, Diamond Bar; Walter D. Bales, Garden Grove, both of Calif.

[73] Assignee: Hughes Aircraft Company, Culver City, Calif.

[22] Filed: May 15, 1970

[21] Appl. No.: 37,788

[52] U.S. Cl. ..............................307/241, 307/237, 307/256

[51] Int. Cl. ..............................H03k 17/00

[58] Field of Search..................307/292, 259, 256, 317, 241, 307/237

[56] References Cited

UNITED STATES PATENTS

| | | | |
|---|---|---|---|
| 2,986,652 | 5/1961 | Eachus | 307/259 |
| 3,349,255 | 10/1967 | McAvoy | 307/292 |
| 2,618,753 | 11/1952 | Mierlo | 307/259 |

*Primary Examiner*—Donald D. Forrer
*Assistant Examiner*—B. P. Davis
*Attorney*—James K. Haskell and Walter J. Adam

[57] ABSTRACT

A precision fast electronic switch is provided in an arrangement wherein, in the absence of a switching signal to the circuit, current flows from a source in one path through one diode to a sink. In the presence of a switching signal the one diode is blocked and the current flows through another diode, connected to said path, to the output. The value of the current which is switched is maintained at a desired reference value by providing the path with a third clamping diode which is connected to a reference voltage.

9 Claims, 3 Drawing Figures

INVENTORS.
JON H. GRANT,
WALTER D. BALES,
BY
Walter J. Adam
ATTORNEY.

PRECISION FAST ANALOG SWITCH

The invention herein described was made in the course of or under a contract or subcontract thereunder with the Air Force.

BACKGROUND OF THE INVENTION

This invention relates to electronic switching circuits and more particularly to improvements therein.

One of the fields of use for solid state switches or gates has been to convert digital signals into an analog signal. This places a requirement upon the circuit employed that it operate at a very high rate, that switching spikes be kept out of the output, and that the output voltage be able to track a reference to great accuracy. The circuit performs the function of changing a set of logic states (which are ultimately determined by a syncro device which supplies information on a radar position) to an analog voltage which represents a radar position. The end result is the display of a radar sweep on a CRT. It is desirable that the appearance of this sweep be as smooth as possible. Standard D–A circuits use a straight binary scheme, that is each successive bit is weighed one-half of the previous one. In a 10-bit digilog employing ±5-v. reference power supplies, for example, the bits would be weighed at 2.5v., 1.25v., 0.625v., 0.3125v., etc. In this arrangement, it is possible to switch the most significant bit one direction, and all other bits the other. This can result in a voltage spike of 5v., if the switches are not perfectly synchronous (which in practice they never are). This results in an unwanted "wiggle" or gap on the displayed radar sweep.

In order to reduce these voltage spikes, a monobit digilog may be used. This consists of a number of equally weighted switches and one binary set of switches (the combined weight of the binary switches equals one of the other monobits). For instance, if 16 equally weighted switches are employed, the maximum spike possible is 5v./16=0.312 volts. A fast switch that can be directly switched from DTL or TTL is desirable in this application. If the weight of each switch must be very precise, a unique switch of the sort described herein is a necessity.

OBJECTS AND SUMMARY OF THE INVENTION

An object of this invention is to provide a novel and accurate analog switching circuit.

Still another object of this invention is the provision of a precise fast analog switch.

Yet another object of the present invention is the provision of a switch which is precise and wherein leakage currents are minimized.

Still another object of this invention is the provision of a novel and useful switching circuit which is usable with diode transistor logic (DTL), or transistor-transistor logic (TTL).

The foregoing and other objects of the invention are achieved in a circuit arrangement wherein in the absence of a switching signal, current is permitted to flow from a source to a junction point and then through a first diode connected to said junction point to a current sink, but not through a second diode which is connected between said junction point and an output amplifier. When it is desired to apply current to the output, a signal is applied to said first diode to block its conduction whereby current is switched and flows through said second diode to the output amplifier. The level or amplitude of the current is maintained constant by connecting a clamping diode between a source of reference potential and the path between the current source and the junction.

DESCRIPTION OF THE PREFERRED EMBODIMENTS

Figure 1:
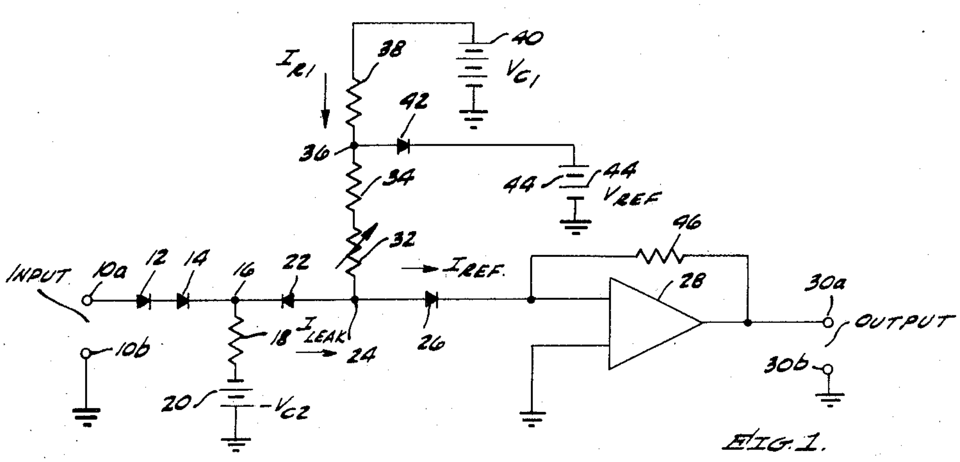
FIG. 1 is a circuit diagram of an embodiment of the invention.

FIG. 1 is a circuit diagram of an embodiment of the invention in which an input switching signal is applied to terminals 10*a*, 10*b*. The terminal 10*b* is connected to ground, terminal 10*a* is connected to two series connected diodes respectively, 12, 14. The cathode of diode 14 is connected to a junction 16, which is connected to ground through a path including a series resistor 18 and a negative potential source 20, referred to as $V_{c2}$.

Junction 16 is connected to a diode 22, which is oppositely poled when referred to the junction 16, as are the serially connected diodes 12 and 14. The anode of diode 22 is connected to another junction 24. A diode 26, which is oppositely poled with respect to junction 24 as is diode 22, connects the junction 24 to the input of an operational amplifier 28. The output of the operational amplifier is connected to output terminal 30*a*, the second output terminal 30*b*, being grounded.

Junction 24 is connected to a potentiometer 32, which in turn is connected through a resistor 34, to a junction 36. Junction 36 is connected to a resistor 38, which is connected to a positive source of potential 40, also designated as $V_{c1}$. Junction 36 is connected to a clamping diode 42, the cathode of which is connected to a source of reference potential 44 having a potential $V_{REF}$.

In the quiescent state or state in which no positive going signal is applied to the input terminals 10*a*, 10*b*, current flows in a path from source 40 through resistors 38, 34, potentiometer 32 through diode 22, and through resistor 18. The operational amplifier input is at virtual ground (± v. offset of op amp input). The negative source of potential 20 makes the end of resistor 18 negative with respect to ground. This insures current flow in the path from the source $V_{cl}$ to the sink $-V_{c2}$. Any other possible leakage current to the amplifier 46 is further minimized by selecting diodes 22 and 26 to have as low leakage characteristics as can be obtained.

The clamping diode 42 and reference potential source 44 insure that the voltage at junction 36 minus the voltage at junction 24 equals the reference potential to the extent that diode 42 and diode 26 are matched. Thereby the reference current is essentially set by this potential together with the setting of the potentiometer 32 and resistor 34. Upon the application of a positive going pulse which exceeds a predetermined threshold level, i.e., one sufficient to block diode 22, current is switched from the path through diode 22 to a path through diode 26 to the operational amplifier 28. Because of current being switched in its path rather than started and stopped by the gating signal applied to the input terminals, current spikes are substantially eliminated. The operation of the switch is fast, there is no hysteresis action, and the reference current is stable.

The reference current can be determined by the following equations:

$$I_{REF}=(V_{REF}+V_{42}-V_{26}+I_{LEAK})/(R_{34}+R_{32}) \qquad (22)$$

Where $V_{42}$ and $V_{26}$ are the voltage drops across diodes 42 and 26 respectively.

Since the potentiometer 32 is variable, any initial error in $V_{REF}$ or mismatch of diodes 42 and 26, which are matched when selected, can be adjusted out and only drift errors need be considered. In order to minimize any drift or change in the term $(V_{42}-V_{26})$, the current $IR_1$, which flows through resistor 38, must be made close to the value $I_{REF}$, assuring equal currents through the diodes. The tolerances of the resistors employed should be chosen for the desired accuracy.

Because matched transistors are more readily obtainable and also because they have better tracking characteristics, it is preferred to employ matched transistors rather than diodes. The transistors should not be saturated at collector voltages which are present when reference current flows, and the speed of the transistors must be sufficient for the application.

Figure 2:
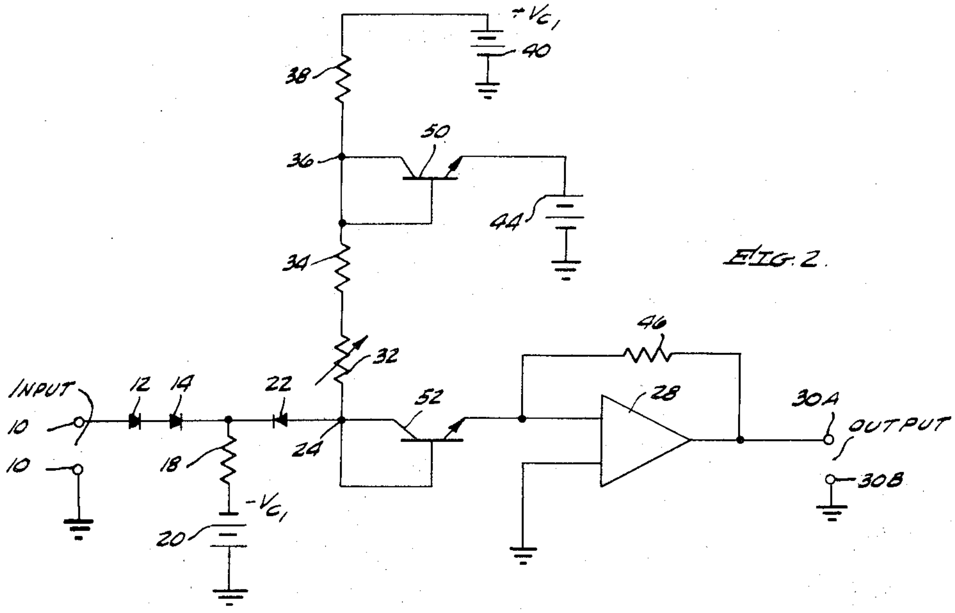
FIG. 2 is a circuit diagram of another embodiment of the invention.

A circuit arrangement of the embodiment of the invention employing transistors is shown in FIG. 2. Similar functioning components are given the same reference numerals as in FIG. 1. It will be seen that the diodes 42 and 26 are replaced in transistors 50 and 52. These are essentially diode connected transistors wherein the collector and base of transistor 50 are connected together to the junction 36, while the collector and base of transistor 52 are connected together to the junction 24. The emitter of transistor 50 is connected to the source of reference potential while the emitter of transistor 52 is connected to the input to the operational amplifier 28.

Operation of the circuit arrangement shown in FIG. 2 is the same as has been described for FIG. 1. In the absence of an input signal, or an input signal which does not exceed a predetermined threshold, current flows from source 40 through the path including resistor 38, resistor 34, potentiometer 32, diode 22 and resistor 18. In the presence of an input signal exceeding this threshold the diode 22 is blocked and the reference current is switched to flow through the path including the collector and emitter of transistor 52 into the operational amplifier 28 input.

By way of illustration of suitable component values for an embodiment of the invention which was built, but not to be construed as a limitation thereon, the following is a list of components which were employed.

| Item | Value | Tolerance | Tracking | Leakage |
|---|---|---|---|---|
| 38 | 2.67K | ±.25% | | |
| 34 | 4.99K | ±.05% | 1.9 p.p.m. to $R_{43}$ | |
| 32 | 20Ω | | | |
| 18 | 6.2K | | | |
| 46 | 625Ω | ±.05% | | |
| 50 and 52 | | $V_{BE}$=.62±03 v | 5μv./° C | 25 na. at 70° C. |
| 22 | | | | 25 na. at 70° C. |

The voltage source 40 was +11 volts, voltage source 20 was −15 volts, and the reference voltage source 44 was +5 volts.

The accuracy of the switch over a temperature range of from 0.° to +70° C. was ±0.036 percent. This assumed an initial error of virtual 0, due to balancing using potentiometer 32. The switching potentials required are on the order of +3.5 volts.

If it is desired to implement a negative logic switch, the voltages shown, the diodes, and the transistor polarities shown would all be reversed. Thus, the circuit shown in the drawing should be considered as illustrative and not as limiting. The switch shown has been used in digital to analog conversion circuits with a fixed reference voltage. It can also be used with a variable reference voltage which however decreases the accuracy somewhat, or, it can be modified to make the voltage $V_{c1}$ track the reference voltage and thus provide high accuracy over a wide range of reference voltages.

Figure 3:
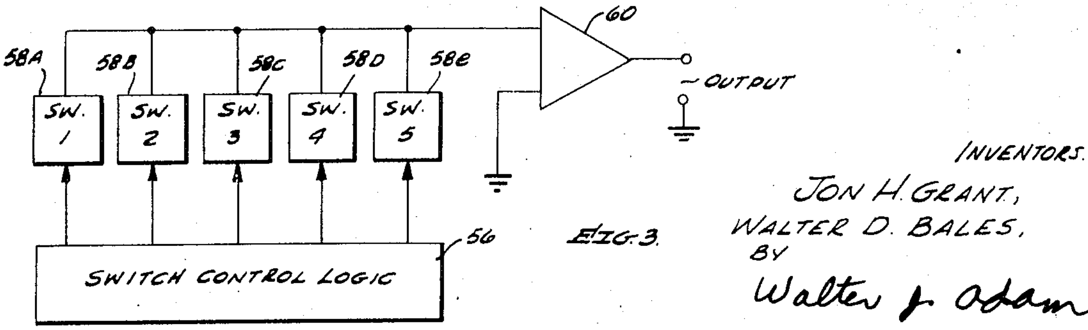
FIG. 3 is a schematic diagram illustrating how the invention is employed in a digital to analog converter.

FIG. 3 is a block schematic diagram illustrating how the switches were used in a digital to analog conversion scheme. Switch control logic 56 applies signals to these switches respectively **58*a* through 58*e* turning on one or more of these in accordance with the digital switching signals received. The current provided by each one of the switches is summed at the input to the operational amplifier 60**, thus providing an output signal whose amplitude represents the digital input.

There has been herein above described a novel, useful switch circuit which is stable, fast and minimizes or eliminates the problem provided by the presently available switch circuits of this type.

What is claimed is:

1. A current switching circuit including a first current path comprising:
  - a current source,
  - a first current sink, and a first and second resistance means and a first diode means all serially connected between said current source and said current sink,
  - an output terminal,
  - a second diode means connected between said output terminal and the junction between said first diode means and said second resistance means, said second diode means being connected to said junction with a polarity opposite to that with which said first diode means is connected thereto,
  - third diode means,
  - a source of reference potential,
  - means for connecting said third diode means between said source or reference potential and the junction between said first and second resistance means with a polarity which is the same as the polarity of the connection of said second diode means to said current path, and
  - input terminal means for applying a potential to said first diode means for blocking conduction therethrough whereupon current flows through said second diode means to said output terminal instead of through said first diode means to said current sink.

2. A circuit as recited in claim 1 wherein said second and third diode means each comprises a transistor, each having emitter, base and collector electrodes, and
  - means connecting the collector of each transistor to its base.

3. A circuit as recited in claim 1 wherein said input terminal means for applying a blocking potential to said first diode means includes a fourth diode means connected to said first diode means with a polarity which is opposite to the polarity with which said first diode means is connected to said first current sink.

4. A switching circuit as recited in claim 3 wherein said fourth diode means comprises two series connected diodes, and
  - said second resistance means includes a potentiometer.

5. A circuit as recited in claim 1 wherein said second and third diode means comprise third and fourth transistors, each having base emitter and collector electrodes, both of said transistors having their bases connected to their collectors.

6. A circuit arrangement for switching a reference current derived from a current source and flowing to a current sink, to an output terminal, by the application of a signal to an input terminal comprising:
  - a path between said current source and said current sink, said path including serially connected first resistance means, second resistance means, first diode means, and a third resistance means,
  - an input terminal,
  - second diode means connected between said input terminal and the junction of said first diode means and said third resistance means with a polarity opposite to the connection of said first diode means thereto,
  - an output terminal,
  - third diode means connected between said output terminal and the junction of said second resistance means and first diode means, the polarity of the connection of said third diode means to said junction being opposite to the polarity of the connection of said first diode means thereto,
  - a source of reference potential, and
  - a fourth diode means connecting the junction of said first and second resistance means to said source of reference potential, the polarity of the connection of said fourth diode means to the junction of said first and second resistance means being the same as the polarity of the connection of said third diode means to the junction of said second resistance means and said first diode means.

7. A switch circuit as recited in claim 6 wherein said third and fourth diode means each constitutes a transistor having emitter collector and base electrodes and having its base connected to its collector electrode.

8. A gate circuit as recited in claim 6 wherein said second resistance means includes a potentiometer.

9. A switch circuit comprising:
  - an input terminal,
  - a first junction, first diode means connected with one polarity between said input terminal and said first junction,
  - a second junction, second diode means connecting said first junction to said second junction with a polarity opposite to the polarity of connection of said first diode means,
  - first resistance means having one end connected to said first junction,
  - means for applying a bias having a first polarity to the other end of said first resistance means, an output terminal, and third diode means connected between said second junction and said output terminal with a polarity opposite to that with which said second diode means is connected to said second junction, a third junction, second resistance means connecting said third junction to said second junction, and third resistance means, having one end connected to said third junction, means for applying potential with a polarity to the other end of said third resistance means which is opposite to the polarity of the potential applied to the other end of said first resistor means, fourth diode means connected to said third junction with the same polarity as said third diode means is connected to said second junction, and means for applying a reference bias to said fourth diode means which is opposite in polarity to that of the bias being applied to the other end of said first resistor.

* * * * *